(12) United States Patent
MacGregor et al.

(10) Patent No.: US 6,749,512 B2
(45) Date of Patent: Jun. 15, 2004

(54) COMPUTER NETWORK IMPLEMENTED GAMING SYSTEM AND METHOD OF USING SAME

(76) Inventors: Brian MacGregor, 31610 Broad Beach Rd., Malibu, CA (US) 90285; Jack W. Selden, 3237 E. Briarcliff Rd., Birmingham, AL (US) 35223

( * ) Notice: Subject to any disclaimer, the term of this patent is extended or adjusted under 35 U.S.C. 154(b) by 166 days.

(21) Appl. No.: 10/099,300

(22) Filed: Mar. 15, 2002

(65) Prior Publication Data

US 2003/0186743 A1 Oct. 2, 2003

(51) Int. Cl.[7] .......................... G06F 17/00; G06F 19/00
(52) U.S. Cl. ........................................... 463/42; 463/43
(58) Field of Search .............................. 463/40–43, 35; 381/98, 124, 29

(56) References Cited

U.S. PATENT DOCUMENTS 5,768,263 A * 6/1998 Tischler et al. ............. 370/263
5,782,692 A * 7/1998 Stelovsky .................... 463/1
6,508,709 B1 * 1/2003 Karmarkar ................... 463/42

OTHER PUBLICATIONS

Finnie, Scott. "Scot's Newsletter". [online]. Sep. 18, 2001—vol. 1, Issue No. 12. [Retrieved on Oct. 24, 2003]. Retrieved from the Internet: <URL: http:www.scotsnewsletter.com/12.htm>.*

* cited by examiner

Primary Examiner—Michael O'Neill
Assistant Examiner—Julie Brocketti
(74) Attorney, Agent, or Firm—I. Michael Bak-Boychuk

(57) ABSTRACT

A real time video frame sequence is spread in time, frame by frame, to match the transmission rate and bandwidth of a computer communication network and once transmitted is reconstructed at the receiving site to its real time frame rate. The video frame sequence may be loaded, frame by frame, into a first-in-first-out memory stack to be substituted for the conventional video frame network transmission whenever a high excitement event is indicated by the audio level associated with the video frame sequence, the first-in-first-out memory stacking allowing for the usual group reaction delay. The method is particularly useful in transmitting video images from selected gaming sites of a casino.

9 Claims, 4 Drawing Sheets

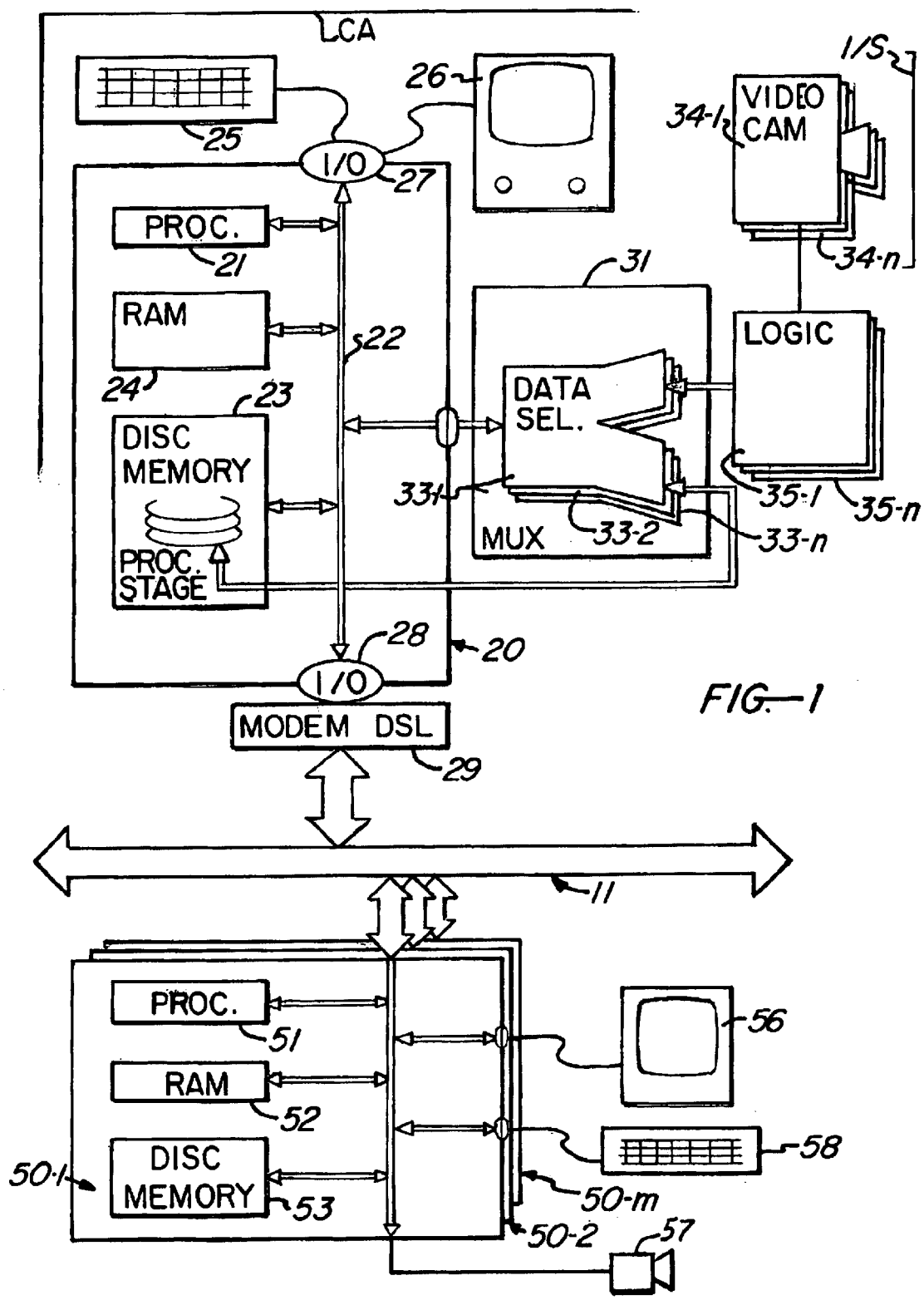
FIG.—1

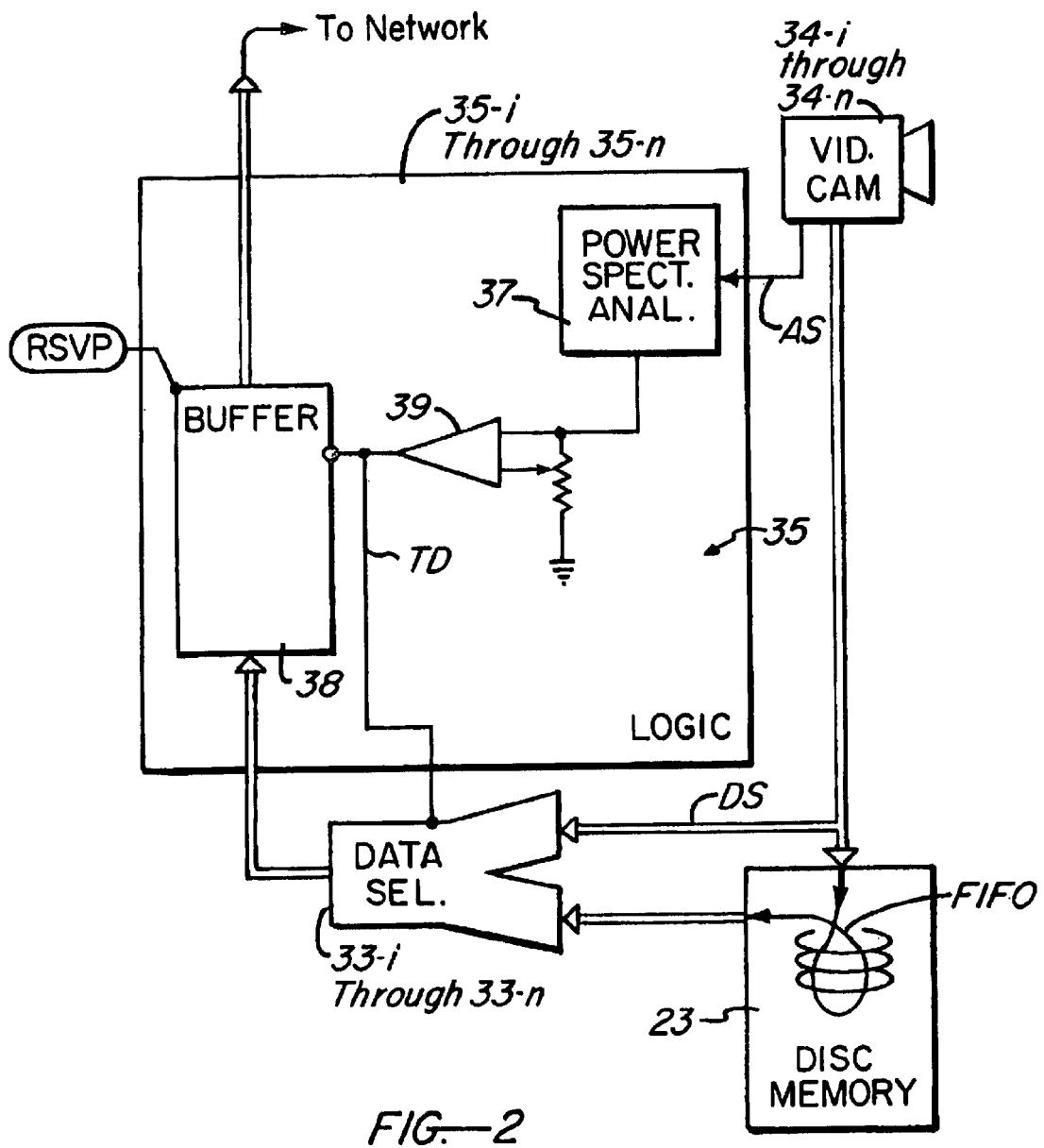
FIG.—2

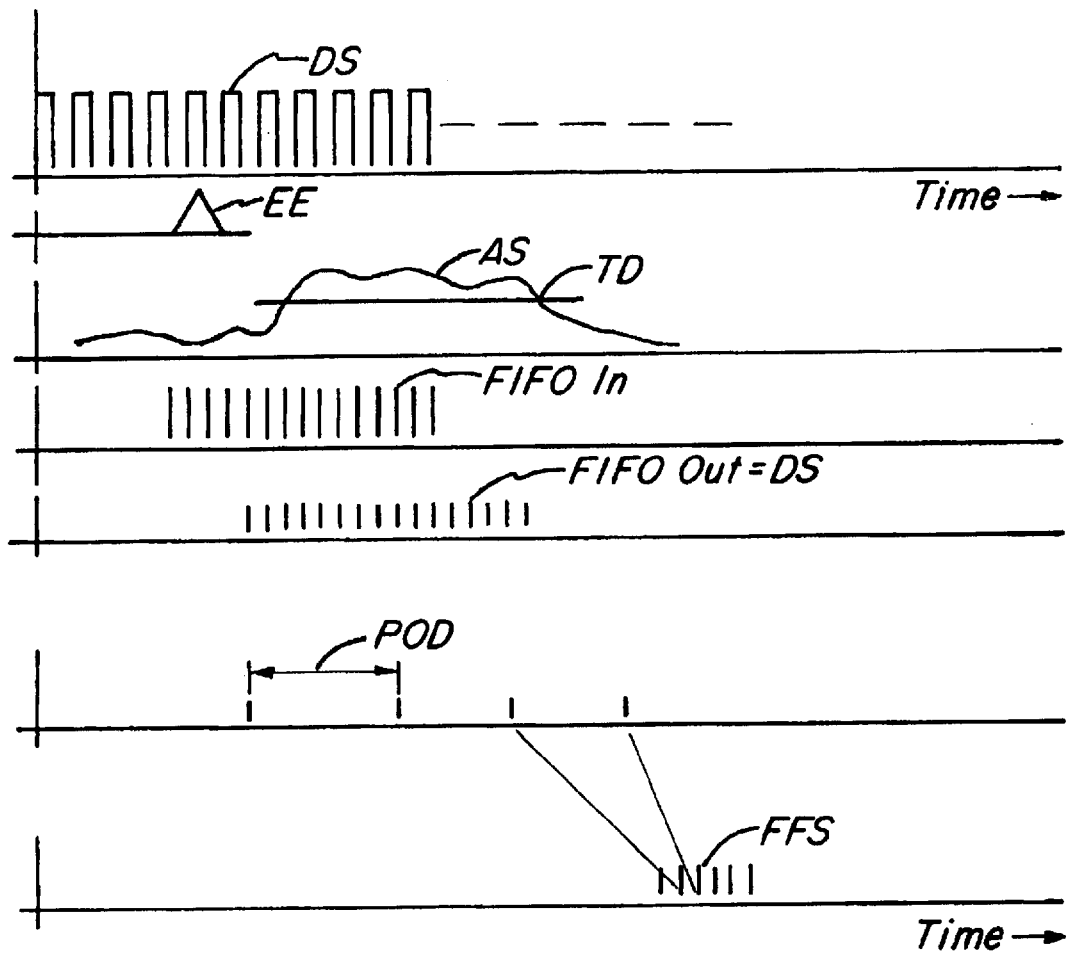
FIG.—3

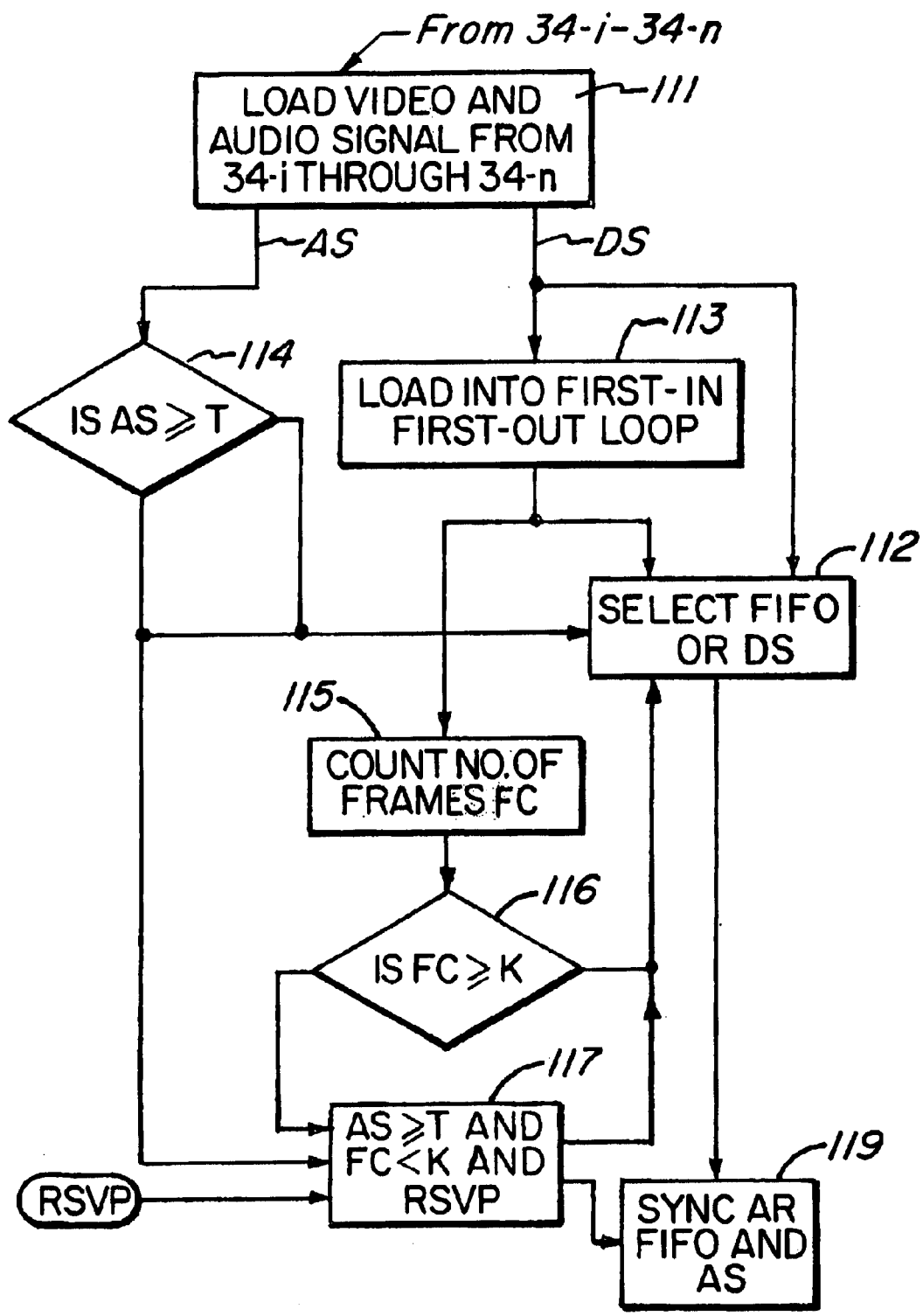
FIG.—4

COMPUTER NETWORK IMPLEMENTED GAMING SYSTEM AND METHOD OF USING SAME

BACKGROUND OF THE INVENTION

1. Field of the Invention

The present invention relates to computer network implemented gaming systems, and more particularly to a system and method for network implemented remote audio and image transmission of real time casino gaming events to enable remote participation therein.

2. Description of the Prior Art

The international nature of computer networks, sometime referred to as the World Wide Web or Internet, has rendered any attempts at complete prohibition of online gambling virtually ineffective. As result all sorts regulatory schemes pockmark the landscape which rather than outright prohibition funnel the online gambling activity into a desired set of privileges and exceptions. For example, the National Indian Gaming Commission has recently ruled that the Indian Gaming regulatory Act, by the simple expedient of a 'proxy' betting mechanism at the end of a phone line, exempts off-reservation remote gambling from the strictures of the Wire Act of 1961. Concurrently, several Federal Court rulings have held that the Wire Act does not apply to those activities that assist gaming communication to a state where it is lawful and the recently proposed Internet Gambling Prohibition Act keeps repeatedly dying many deaths in committee. Those attempts at prohibition that still persist, mainly at the state level, are colored by self-interest, as best exemplified by the online gambling prohibitions enacted in Nevada.

These manifestations of self-interest have not done well in the international setting, particularly amongst those countries whose citizenry has reached the wisdom and maturity to inspect, reject and strip off all pretextual patinas of morality that sometimes cover greed or self-interest. For example, the United Kingdom is now enacting statutory schemes which regulate, but do not prohibit, online gambling and the physical dictates of self-interest will compel similar responses from others if large scale monetary consequences are to be prevented. The dam has broken and online gambling is not just as an isolated privilege but a fact of life.

Consistent with these developments various network implemented gaming systems have been devised, exemplified by the teachings of U.S. Pat. Nos. 5,333,868 to Goldfarb, 5,351,970 to Fioretti and others. While suitable for the purposes intended each of the foregoing implement a computer program generated wholly virtual gaming system with the game, its images and sequences synthetically created and random number generated. Like all computer programs these can be easily replicated and have been even modified on occasion into various fraudulent bilking mechanisms. The same difficulties that have rendered prohibition virtually impossible are also in effect here and the population of such fraudulent sites will only increase as online gambling enters the mainstream. Notably, in the business of gambling even small levels of fraud are unwanted as the notion of cheating at cards or other games of chance is a venerable and familiar one. The reputation of a casino has therefore served for a long time as the underpinning for customer reliance and the brick-and-mortar facility remains the centerpiece for any effective marketing of gaming. These reasons limit the usefulness of program generated, wholly synthetic gaming events even if associated with some symbol of a real casino.

While trademark and trade dress policing may have had some effect, there exists nonetheless a persistent population of unscrupulous web site providers which boldly mimic or suggest association with an established casino to perpetrate fraud using doctored gaming programs. Verification by the potential patron is therefore a necessary ingredient of the process and one reliable verification of a gaming web site is the ability to browse through and inspect, at will, the several gambling venues of the real brick and mortar casino that is associated with the site. Such inspection cannot just entail some group of still pictures but should depict live and unrehearsed gambling in order to instill the confidence that the image is not merely a staged event and the selection of the accessible gambling venues should be both extensive and wholly within the viewers choice. Of course, these same features will expose the remote viewer to the compelling venues where the excitement of the local participants itself provides the inducement to join the game. In this manner the same process that instills verifiable association with a casino is also useful to attract those making the remote inspection into the game.

In the past various techniques have been devised which in one way or another provide a remote video display of a gaming event. For example U.S. Pat. No. 5,297,802 to Pocock describes a televised bingo game, U.S. Pat. No. 5,324,035 to Morris et al describes a video gaming system with various betting pools, and so on. These each rely on conventional transmission of a video signal which currently exceeds the bandwidth of a computer network. In the main computer networks have been associated as an adjunct to video signals, as for example program selection guides, such as those described in U.S. Pat. Nos. 5,532,754; 5,479,266; 5,479,268; and others all assigned to Starsight Telecast, Inc. of Fremont, Calif., or those assisting the operation of video cassette recorders like that taught in U.S. Pat. No. 5,151,789, also assigned to the same assignee. The use of a computer network as both the selection tool and also as a full fidelity video image signal carrier has not had much attention in the prior art, primarily because of the limited data rate, or bandwidth, and propagation delays inherent in any distributed network.

Those in the art will appreciate that the physical scaling laws of a human have dictated the response frequency of our visual processing system. Thus there is a minimum frame rate that must be exceeded in order to avoid the perception of flicker. More importantly, the scenes that convey most of the exciting events are group scenes, fill of very fine detail and therefore not susceptible to most current compression techniques as these rely on reductions of the field of view and/or reduction of detail. Nor do these group scenes lend themselves to effective compression along the time vector (change from a base frame), pattern recognition compression like interpolation (MPEG), spectral analysis based compression like JPEG and others. In the main these prior art interpolation techniques rely on a common scheme or focus in the frame image to base the deviations therefrom as the mechanism for data reduction. The scenes conveying players' excitement lack this central theme and are therefore difficult to compress to any degree while the minimum frame rate that avoids flicker has been earlier determined by scaling laws to be an immutable physical limit.

The same mechanisms of evolution that have observed the laws of physics like energy conservation have also evolved a human sensorium that emphasizes changes in the matter sensed and defers to boredom the steady state. Simply, in the large scale this is the better compression technique which is synergistically combined with the inherent propagation delays of a distributed computer network to accommodate the verification and entertainment aspects of a plurality of remotely viewed casino venues and it is such combination that is disclosed herein.

SUMMARY OF THE INVENTION

Accordingly, it is the general purpose and object of the present invention to provide a computer network video image transmission process in which the frequency of the sensed image frames is varied according to the change in audio level in the area that is imaged.

Other objects of the invention are to provide a computer network enabled video image transmission process in which selected video image sequences are serially transmitted on the network with their reception display delayed to accommodate the bandwidth limitations of the network.

Further objects of the invention are to provide a video image transmission system in which the video images are transformed to a transmission time interval that is greater than the original video image frame rate to thereby conform with the data transmission rates of a computer network and thereafter reconstructed to the original frame rate at the receiving terminal delayed by the cumulative time differential between the transformed transmission and the original frame rate.

Briefly, these and other objects are accomplished within the present invention by providing a plurality of monitors throughout a casino each conformed to sense and record the optical scene before it together with the associated audio signals. The high data content video signal is then split from the audio signal and the separated audio component is compared for total sound energy changes by a shaped analyzer which may take the form of a spectrum analyzer with the square of the weighted spectral components summed into a single output and then differentiated to detect audio energy changes. A comparator or detector is then utilized to sense the change in audio level above a predetermined threshold that is normally associated with a participants' reaction to some surprising event like an extremely favorable draw of playing cards, a surprising coincidence at the roulette wheel or some other unusual gaming development. In the course of this discrimination these various spectra of the audio signal are shaped by the weighting coefficient in order to emphasize the higher components usually associated with excitement from ordinary changes in audio intensity.

Those skilled in the art will appreciate that any human response will include the usual delays that are part of a reaction and there is therefore a predictable delay that may range between 1 and 3 seconds between the surprising event and the participants' response thereto. To accommodate this delay both the video and audio signals are delayed each by a fixed, equal interval obtained by any conventional means such as a delay line or buffer, depending on the type of implementation When the audio level change indicates an unusual gaming event then a higher video frame rate is commenced in the undelayed video signal passed into the network at the network bandpass rate limit with selected video frames being marked for synchronization to the audio signal. At the subscribing receiver console these higher density video frames are reassembled and the audio signal further delayed and synchronized with the reconstructed video signal by the markers earlier applied thereto. In this manner a substantially higher video frame rate is passed by the conventional network with the delays associated therewith being within the customary propagation delay intervals of a distributed network. The gaming events of particular interest are therefore reconstructed at the remote site to a much higher fidelity.

The foregoing system may be further enhanced to function simultaneously with a conventional electronic game process in which the cards may be electronically read, as by way of bar code for example or the thrown dice combination is keyed in by the dealer. In the case of craps, for example, the live players play as they would at any other craps table. However, as the live bets are being wagered and executed, an unlimited number of virtual participants are also wagering on the game; feeding upon the same energy created in the live environment. The remote player is able to watch the shooter and all the live players; see the dice as they fall and be swept up in the betting frenzy that so often grows out of a "hot" table. Of course, the necessary delays of the foregoing process as well as the customary network propagation delays will require an earlier betting cut-off for the remote players. In this manner a system and process are devised which communicate over the existing narrow bandwidth computer network the exciting portions of any game venue in a casino that is selected randomly by the remote viewer, thereby conveying both the live excitement and the assurance that the images are from a real, well known enterprise.

It will be appreciated that most data compression techniques rely on prediction to a large extent in the selection of the data that is to be compressed or omitted. The recognition of a pattern is therefore at the core of compression. This, however, contradicts the spontaneous nature of human excitement and thus the assurance aspects of an event perceived to be real and unrehearsed. Thus the usual compression techniques obscure rather than emphasize the images associated with gaming. Simply, the predictive and pattern determined processes of data compression are in apposite in a system that emphasizes spontaneity and surprise.

BRIEF DESCRIPTION OF THE DRAWINGS

FIG. 1 is a block diagram of a computer network adapted for use with the inventive process described herein;

FIG. 2 is a logic diagram illustrating a logical arrangement useful in managing the frame rate transmitted to the network according to the present invention; and FIG. 3 is a signal timing chart illustrating the audio and video data streams synchronized and expanded according to the present invention; and FIG. 4 is a sequence diagram, or flow chart, of the steps effected as a part of the inventive process disclosed herein.

DESCRIPTION OF THE PREFERRED EMBODIMENT

As shown in FIG. 1 the present invention is rendered operative by way of a computer communication network generally designated by the numeral 10 which includes the conventional and well known signal transmission network 11 sometimes referred to as the Internet, to which at least one processing stage 20 is connected and forming a part of the present invention. Processing stage 20 may comprise a data processor 21 provided with a local bus 22, a large storage memory in the form of a disc assembly 23 connected to the bus, a temporary memory array 24 along with the customary communication devices like a keyboard 25, a monitor 26 and a set of I/O ports 27 and 28, the latter being tied to a communication interface 29 conformed to communicate with the network 11. I/O port 27, in turn, may be connected to a data selector 31 which selects for processing and network transmission the data contained in one or more data selectors 33-1 through 33-n. Each of the selectors 33-1 through 33-n, in turn, is operatively connected to receive data from a corresponding video camera 34-1 through 34-n viewing a particular venue or site VS within the casino CA or the same video stream delayed through a storage cycle of about three seconds worth of video data through the permanent memory storage or disc assembly 23 The selection of each such data stream is coordinated by the inventive data management logic stage 35-1 through 35-n each conformed in like manner in accordance with the description set out by reference to FIG. 3 hereinafter below.

A set of using station 50-1 through 50-m may also be tied to the network 11 which may select a communication path to the processing stage 20 or to any other processor or server that is is tied to the network 11. Once again, these using stations may take the known conventional form of a personal computer including its processing stage 51, a disc storage 53, a monitor 56 and output device like a speaker 57. By directing the process within each using station 50-1 through 50-m through a local keyboard 58 or other selection mechanism the user, in a manner described more precisely below, then selects the particular venue or site VS for remote viewing. Of course, this viewing is confined by the network transmission bandwidth, network propagation delays, data collisions and use competition from others, resolved by the well known network sharing protocols associated with all asynchronous network systems. For example, in today's Internet organization video signal transmission is managed on an end-to-end basis by transmission control protocols like FTP, HTTP and/or TELNET. These protocols or applications are based on fairness and therefore require good manners from the sending source, limiting any efforts at overuse by a single sender. Simply, the current Internet operates on a best effort basis and cannot guarantee the necessary bandwidth to each sender at all times, relying instead on democratic allocation like the generally known resource allocation protocol RSVP. There is therefore no realistic possibility, nor even expectation, that the Internet path to a particular viewer can accommodate a real time video data stream coming from a selected venue VS of the casino CA. The proliferation of network users, moreover, has chronically outstripped any increases in bandwidth and there is therefore little prospect of excess bandwidth in the near future. Simply, the Internet, like our transportation system, remains at maximum capacity and while total traffic volume may be increased little relief is obtained from the fiberoptic superhighway segments that are periodically added thereto. A broadly accessible real time video over a generally available network is therefore unlikely in the foreseeable future and for this reason a sequence and process are devised that select only those parts of the real time stream that are of interest spread in time onto the timing intervals set by the network, to be thereafter reassembled at the receiving station.

By particular reference to the logic and timing diagrams shown in FIGS. 2 and 3 the inventive process and system continuously captures by way of the video cameras 34-1 through 34-n the images and audio from the various venue sites VS that may be of interest to a remote viewer and continuously stores a segment of each sequential video data stream comprising about 100 frames (about three seconds real time) in the permanent disc storage 23. This may be effected by the processor 21 which is directed into a do-loop in the nature of a continuous first-in-first-out data overlay into selected sectors of the disc storage 23 that are dimensioned to receive the video data of about 100 frames to be pushed out as delayed video data stream FIFO. At the same time each of those video cameras 34-1 through 34-n that have been selected for viewing by any one of the remote viewing stations transmits directly to the network 11 those frames that correspond to the network protocol rate RSVP along with the much narrower audio signal AS associated with the video stream that is transmitted in its entirety.

Like numbered parts functioning in like manner, this audio signal AS is sensed within each logic stage 35-1 through 35-n by way of a power spectrum analyzer 37 producing, in well known manners, a Fourier transform quadratic signal indicative of the local sound energy level within a particular range of audio frequencies at the corresponding venues VS. This output is then compared against a preselected level in comparator 39 to produce a threshold detection signal TD from the comparator output which is fed to the corresponding data selector 33-1 through 33-n to toggle the data path passed by the particular data selector between the delayed data video data stream FIFO of the processor do loop or the direct data stream DS issuing from the video cameras 34-1 through 34-n. The data selectors 33-1 through 33-n then pass the selected video data to the local bus 22 to be stored for transmission in an output buffer 38 storing the frame data that is to be processed for transmission into the network 11 by the processing stage 21. In the course of this transmission that data that is delayed by the do loop process, referred to as the FIFO signal, is passed, frame by frame, to the network at the rate set by the network protocol like RSVP, while the undelayed data stream DS from the video cameras 34-1 through 34-n is passed to the network 11 in the form of selected frames only by the conventional RSVP protocol. Thus the image sequence following an exciting event that sets off comparator 39 is passed frame by frame onto the network 11, at the network video transmission rate. The video frames from the uneventful periods, in turn, are only sporadically passed. Of course, various timing coordination tags that synchronize the audio signal AS with the video frames may be inscribed in both the video and audio data according to conventional practice.

At the receiving end using stations 50-1 through 50-m are similarly directed into a do loop sequence which loads each frame by frame signal stream FIFO carried on network 11 into its disc memory 53, accumulating the sequential frames to form a continuous image in yet another first in first out storage stack which is thereafter displayed in real time synchronism with the audio signal AS that is similarly stored. To limit the masking effect of this delayed transmission on the events that may follow a maximum frame number may be imposed, like 600 frames approximating 20 seconds, which will then direct the data selectors 33-1 through 33-n to revert back to the undelayed data stream DS.

By further reference to the timing charts shown in FIG. 3a the exciting event EE precedes by the usual group response period an increase in the energy level of the audio signal AS which, upon reaching the threshold of comparator 39, sets off the toggling signal or threshold detection signal TD toggling the data selectors to pass into buffer 38 that frame-by-frame data stream FIFO. This sequential frame signals FIFO accumulates in the buffer 38 until the buffer storage is saturated or until the signal DS drops off. At both of these end conditions either a new buffer loading with the FIFO signal commences or the direct video signal VS is passed to the buffer. In both instances buffer 38 unloads through interface 29 at the network dictated frame rate of the protocol like RSVP. Of course, both the direct video signal VS and the frame-by-frame signal FIFO are loaded into the buffer with the associated and digitally encoded audio signal AS to be reconstructed at the receiving stations 50-1 through 50-m as a full fidelity video and audio segment FFS delayed by propagation and other delays POD of the network. Thus the high excitement portions of both the video and audio stream are reproduced with full fidelity at the remote viewer's station, assuring the viewer that he or she are looking at a real casino site. This assuring image sequence may then be associated with various remote gaming arrangements, including prior art remote gaming systems that automatically read the dealt cards or the final orientation of thrown dice, by way of known optical, magnetic or barcode readers, allowing the remote viewer to participate in the game.

Those in the art will appreciate that even though the foregoing description refers to devices like data selectors, buffers or data multiplexers, such is for descriptive convenience only. The same functions can be carried out by directing the operations in the using system 20 and the several receiving systems 50-1 through 50-m in a sequence of steps illustrated in FIG. 4, the description thereof being generally applicable to the teachings above with substantially equal applicability. Specifically, in step 111 the continuous frame and audio data stream from the several video cameras 34-1 through 34-n is converted to digital format and the video portion is fed in parallel both to a logical OR selection step 112 serving the function of data selectors 33-1 through 33-n and also into the first-in-first-out step 113 in a stack formed in the disc storage 23. In step 114 the power spectrum of the audio signal AS is compared against the threshold and if grater the FIFO output of step 113 is fed to the selection step 112. At the same time a frame count is initiated in step 115 and compared against a maximum number in step 116. If the count is exceeded step 116 resets the selector step 112. Until thus reset the data transfer to the network is controlled by step 117 which logically locks the FIFO frame by frame output with the protocol RSVP. Once reset the video data is fed to the network 11 in the conventional manner. At the receiving end the video and audio data streams are synchronized in step 119 in accordance with the timing signals referencing the audio.

In both implementations those segments of a video scene that are associated with a heightened audio level are passed to the remote viewer in their high frame density form, the deficit in bandwidth being compensated by a delayed image sequence at the receiving device.

Obviously, many modifications and variations of the above teachings can be effected without departing from the spirit of the invention instantly disclosed. It is therefore intended that the scope of the invention be determined solely by the claims appended hereto.

It is claimed:

1. A method for transmitting on a computer communication network a sequence of video frames depicting a gaming event in a casino selected in accordance with the audio level associated therewith, portions of said sequence to be reconstructed at a receiving computer system to a rate substantially equal but delayed in real time, comprising the steps of:

sensing by way of a video camera the image and the audio associated therewith within a selected portion of said casino to produce a data stream including a sequence of real time video frames and audio data;

comparing the level of said audio against a predetermined threshold to produce a data selection signal indicative of the comparison therebetween;

sequentially storing a predetermined plurality of said video frames in a first-in-first-out memory overlay storage arrangement to produce a stream of delayed video frames and correspondingly delayed audio data;

selecting in accordance with said data selection signal for transmission onto said computer network selected ones of said real time video frames or alternatively each one of said delayed video frames stored in sequence in said memory overlay storage arrangement;

transmitting onto said computer network said selected ones of said real time video frames or said stream of delayed video frames at the transmission rate determined by said network;

connecting one or more of said receiving computer systems to said network; and reconstructing in said receiving computer system said stream of delayed video frames into a video frame sequence separated by time intervals substantially equal to the frame intervals of said video camera.

2. A method according to claim 1, wherein:

said step of reconstructing includes the further step of correlating said video frame sequence with said audio signal.

3. A method according to claim 2, wherein:

said transmitting step includes the further step of maintaining a network sharing protocol conformed to regulate the rate of video frame signals transmitted to the network.

4. A method for transmitting on a computer communication network a sequence of video frames depicting a gaining event in a casino selected in accordance with the audio level associated therewith, comprising the steps of:

sensing by way of a video camera the image and the audio associated therewith within a selected portion of said casino to produce a data stream including a sequence of real time video frames and audio data;

comparing the level of said audio against a predetermined threshold to produce a data selection signal indicative of the comparison therebetween;

sequentially storing a predetermined plurality of said video frames in a first-in-first-out memory overlay storage arrangement to produce a stream of delayed video frames and correspondingly delayed audio data; and selecting in accordance with said data selection signal for transmission onto said computer network selected ones of said real time video frames or alternatively each one of said delayed video frames stored in sequence in said memory overlay storage arrangement.

5. A method according to claim 4, comprising the further step of:

transmitting onto said computer network said selected ones of said real time video frames or said stream of delayed video frames at the transmission rate determined by said network.

6. A method according to claim 5, comprising the further step of:

connecting one or more receiving computer systems to said network.

7. A method according to claim 6, comprising the further step of:

reconstructing in said receiving computer system said stream of delayed video frames into a video frame sequence separated by time intervals substantially equal to the frame intervals of said video camera.

8. A method according to claim 7, wherein:

said step of reconstructing includes the further step of correlating said video frame sequence with said audio signal.

9. A method according to claim 8, wherein:

said transmitting step includes the further step of maintaining a network sharing protocol conformed to regulate the rate of video frame signals transmitted to the network.

* * * * *